United States Patent
Liaw et al.

(10) Patent No.: US 10,665,869 B2
(45) Date of Patent: May 26, 2020

(54) WATER-ACTIVATED POWER GENERATING DEVICE WITH VENTS

(71) Applicants: Kuo Ming Liaw, Taipei (TW); Sung Nien Kao, Taipei (TW)

(72) Inventors: Kuo Ming Liaw, Taipei (TW); Sung Nien Kao, Taipei (TW)

( * ) Notice: Subject to any disclaimer, the term of this patent is extended or adjusted under 35 U.S.C. 154(b) by 0 days.

(21) Appl. No.: 16/037,071

(22) Filed: Jul. 17, 2018

(65) Prior Publication Data

US 2020/0028185 A1    Jan. 23, 2020

(51) Int. Cl.
| | |
|---|---|
| *H01M 6/34* | (2006.01) |
| *H01M 4/06* | (2006.01) |
| *H01M 6/18* | (2006.01) |
| H01M 4/02 | (2006.01) |

(52) U.S. Cl.
CPC .............. *H01M 6/34* (2013.01); *H01M 4/06* (2013.01); *H01M 6/181* (2013.01); *H01M 6/187* (2013.01); *H01M 2004/025* (2013.01); *H01M 2300/0068* (2013.01); *H01M 2300/0082* (2013.01)

(58) Field of Classification Search
CPC .......... H01M 6/34; H01M 6/181; H01M 4/06; H01M 6/187; H01M 2300/0082; H01M 2004/025; H01M 2300/0068

USPC ........................................................ 429/119
See application file for complete search history.

(56) References Cited

U.S. PATENT DOCUMENTS

2015/0004457 A1\*    1/2015  Visco ..................... H01M 6/34
                                                                                                              429/119

\* cited by examiner

*Primary Examiner* — Gary D Harris
(74) *Attorney, Agent, or Firm* — WPAT, PC

(57) ABSTRACT

A water-activated power generating device comprising a silicon slice having a cut, a first water storage element, and a fixing ring sandwiched by the silicon slice and the first water storage element and having an inner space. The water-activated power generating device further comprises a conductive rod penetrating the silicon slice, the fixing ring, and the first water storage element. The water-activated power generating device further comprises an electrode structure having a hollow cylinder shape and an isolation film disposed adjacent to an inner surface of the electrode structure. Electrolytic powder is disposed in a space between the isolation layer and the conductive rod; and a bottom conductive plate is disposed at the bottom of the electrode structure and electrically connected to the inner surface of the electrode structure.

16 Claims, 3 Drawing Sheets

WATER-ACTIVATED POWER GENERATING DEVICE WITH VENTS

TECHNICAL FIELD

This invention generally relates to a power generating device. More specifically, this invention relates to a water-activated power generating device.

BACKGROUND

Market available consumer batteries such as button cell batteries or zinc-carbon batteries are generally called primary cell. These batteries are designed to be used once and then discarded. As primary cells are used, chemical reactions in the battery use up the chemicals, thus generating power. When the chemicals are used up, the battery stops producing electricity. Primary cells are generally cheaper to manufacture, and tend to have lower retail prices. However, the heavy metals and electrolytes contained in primary cells are harmful to the environment, resulting in environmental pollution when they are discarded. For example, if electrolytes contained in the primary cells leak out, this may cause a chemical reaction with water, which then produces toxic substances.

In recent years, research for alternatives to traditional primary cells has made significant progress. A water-activated power generating device, generally known as a water battery, is an example of the alternatives. A water battery is a battery that does not contain any electrolytes, and hence produces no voltage until it is soaked in or filled with water. Therefore, in comparison with traditional primary cells, water batteries are easily stored, since chemical reactions will not occur if no water comes into contact with the water battery. Water batteries can be stored in warehouses or on shelves for years without consuming any of the chemicals in the water battery. Furthermore, the materials used for manufacturing water batteries are environmentally friendly, which means that when a water battery is discarded, the components of the water battery can be easily recycled, and do not produce toxic substances.

Water batteries can be made into various shapes and may have different sizes and dimensions. However, as modern portable electronic devices are designed to use standard primary batteries, it is common that water batteries are made in accordance with the primary battery standards. For example, water batteries made in accordance with the technical standards for battery sizes and types published by standards organizations such as International Electrotechnical Commission (IEC) and American National Standards Institute (ANSI) are available in the market in recent years.

Conventional water batteries have some drawbacks. As mentioned above, water batteries start to produce voltage/current until it is soaked in or filled with water. The water filling into a water battery sometimes leaks out and thus damages the electronic device that contains the water battery. In addition, the air/gas produced during the chemical reaction accumulates within the body of a battery, and if the water battery does not include a well-functioning air vent/channel for gas emission, the pressure in the body of the battery will increase and thus eventually damage the battery. The life of a water battery is another concern. The lifetime of a traditional water battery is sometimes shorter than a primary battery and thus adversely affects the market potential of water batteries.

Therefore, there is a need to develop a water-activated power generating device that overcomes the above-mentioned problems.

SUMMARY

The devices of the invention each have several aspects, no single one of which is solely responsible for its desirable attributes. Without limiting the scope of this invention, its more prominent features will now be discussed briefly. After considering this discussion, and especially after reading the section entitled "Detailed Description of Certain Embodiments" one will understand how the features of this invention provide advantages over other water batteries.

The embodiments of the present disclosure provide a water-activated power generating device. The water-activated power generating device comprises a conductive cap, a top plate having an air vent, a silicon slice having a cut, a first water storage element, and a fixing ring sandwiched by the silicon slice and the first water storage element and having an inner space. The water-activated power generating device further comprises a conductive rod penetrating the top plate, the silicon slice, the fixing ring and the first water storage element, and electrically connected to the conductive cap. The water-activated power generating device further comprises an electrode structure having a hollow cylinder shape and an isolation film disposed adjacent to an inner surface of the electrode structure. Electrolytic powder is disposed in a space between the isolation layer and the conductive rod; and a bottom conductive plate is disposed at the bottom of the electrode structure and electrically connected to the inner surface of the electrode structure.

In some embodiments, the inner surface of the electrode structure comprises micro patterns.

In some embodiments, the fixing ring comprises a notch. The notch is aligned with the cut of silicon slice and the air vent of the top plate in a direction parallel to the inner surface of the electrode structure.

DETAILED DESCRIPTION OF CERTAIN EMBODIMENTS

The following detailed description is directed to specific embodiments of the invention. However, the invention can be implemented in a multitude of different ways. In this description, reference is made to the drawings, wherein corresponding parts are designated with numerals throughout.

Figure 1:
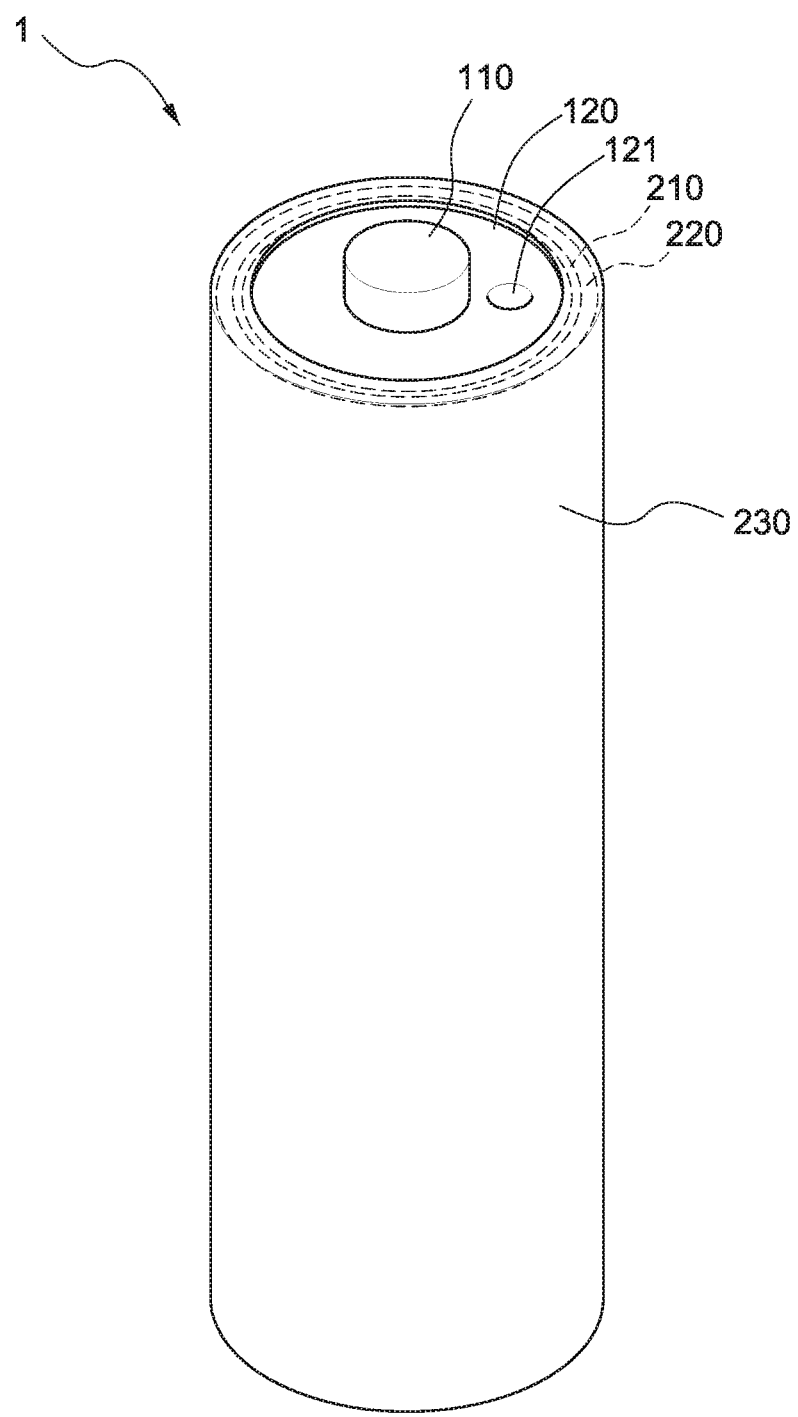
FIG. 1 is a schematic view of a water-activated power generating device according to an embodiment of the subject invention.

FIG. 1 is a schematic view of a water-activated power generating device according to an embodiment of the subject invention. Please note that the components shown in FIG. 1 are not drawn to scale, and are solely for illustrative purposes. Referring to FIG. 1, the water-activated power generating device 1 includes a conductive cap 110, a top plate 120, an isolation film 210, an electrode structure 220 and a wrapper 230. The top plate 120 includes an air vent 121 formed in the top plate 120. As shown in FIG. 1, the water-activated power generating device 1 may be, for example, cylindrical. In some embodiments, the water-activated power generating device 1 may include another shape. In some embodiments, the water-activated power generating device 1 includes a rectangle shape.

Figure 2:
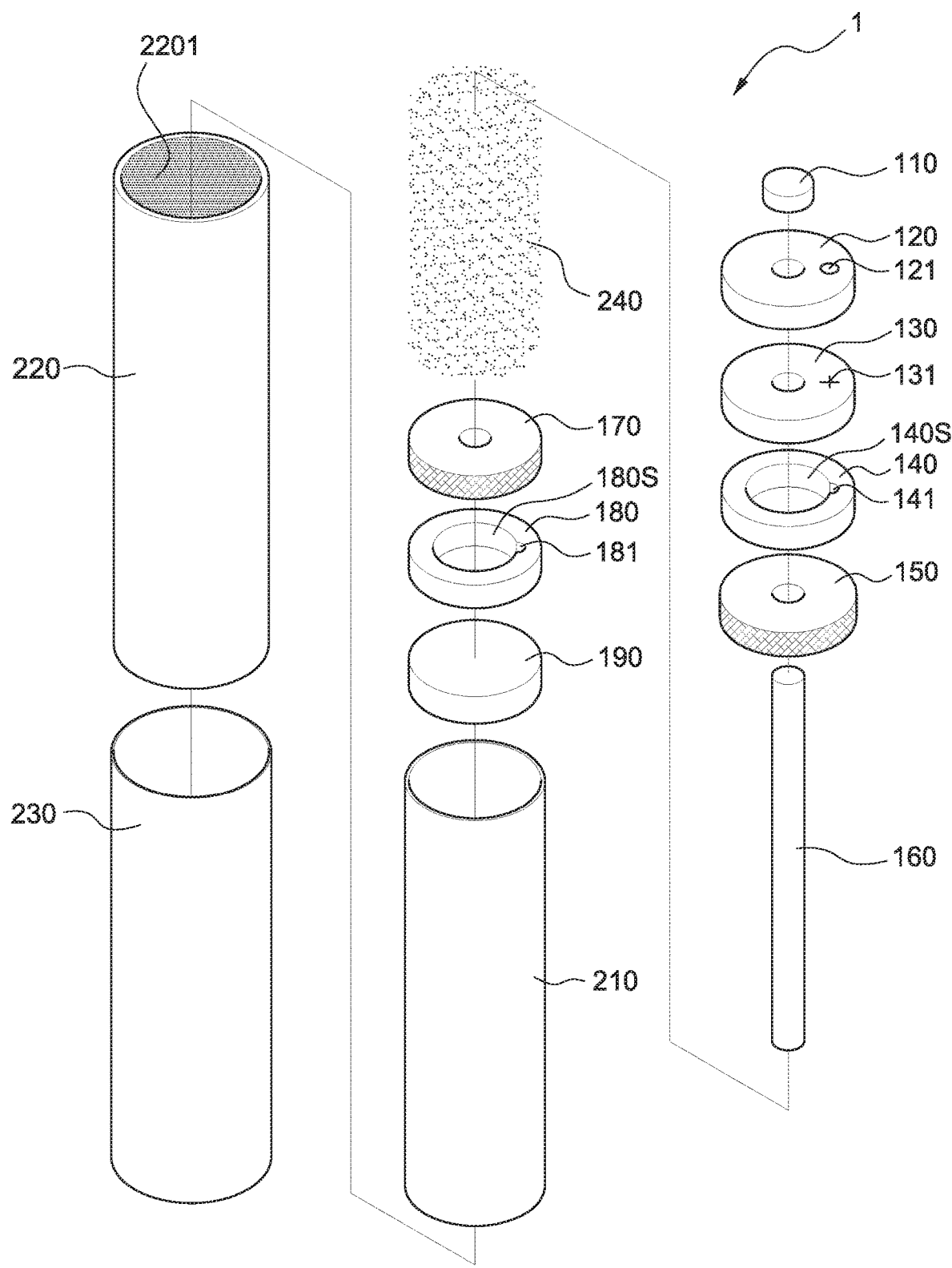
FIG. 2 is an exploded view of a water-activated power generating device, according to an embodiment of the present disclosure.

FIG. 2 is an exploded view of a water-activated power generating device according to an embodiment of the present disclosure. Referring to FIG. 2, the water-activated power generating device 1 further includes a silicon slice 130, a fixing ring 140, a first water storage element 150, an electrically conductive rod 160, electrolytic powder 240, a second water storage element 170, a second fixing ring 180, and a bottom conductive plate 190.

The silicon slice 130 includes a cut 131 for air/gas to pass through. The silicon slice 130 is flexible and has a thickness, and thus the cut 131 is usually closed and can prevent liquid or water from passing through. The fixing ring 140 includes an inner space 140s and a notch 141. The inner space 140s can hold the air/gas produced during the chemical reactions of the water-activated power generating device 1. The air/gas accumulated in the inner space 140s will slowly leak out through the cut 131 and the air vent 121 when the pressure within the inner space 140s increases. Therefore, the inner space 140s works as a pressure controller and can prevent damage to the water-activated power generating device 1 due to over-pressure.

The notch 141 is aligned with the air vent 121 and the cut 131. The notch 141 is aligned with the cut 131 of silicon slice and the air vent 121 of the top plate in a direction parallel to the inner surface 2201 of the electrode structure 220. Water can be put into the water-activated power generating device 1 through the air vent 121, the cut 131 and the notch 141, and then the water-activated power generating device 1 will start to generate power.

The first water storage element 150 and the second water storage element 170 are made of a water-absorbing material. The first water storage element 150 and the second water storage element 170 are designed to hold water that is necessary for the water-activated power generating device 1 to generate power. In some embodiments, the first water storage element 150 and the second water storage element 170 include wood pulp cotton. In some embodiments, the first water storage element 150 and the second water storage element 170 include bibulous paper. In some embodiments, the first water storage element 150 and the second water storage element 170 include at least one of hemp, bamboo, microfiber, and plastic fibers.

Referring to FIG. 2, the conductive rod 160 penetrates the top plate 120, the silicon slice 130, the fixing ring 140, and the first water storage element 150. The conductive rod 160 is electrically connected to the conductive cap 110. The conductive rod 160 is made of conductive materials such as metal, alloy or any other suitable materials. In some embodiments, the conductive rod 160 includes at least one of petroleum coke, coal, graphite, or carbon black. The conductive rod 160 will not be consumed during the chemical reactions of the water-activated power generating device 1. The conductive rod 160 is used for conducting current and/or electrons/ions.

The electrolytic powder 240 is disposed between the first water storage element 150 and the second water storage element 170 and between the conductive rod 160 and the isolation film 210. The isolation film 210 can avoid direct contact between the electrolytic powder 240 and the electrode structure 220. The isolation film 210 is porous. That is, the isolation film 210 includes spaces or holes through which liquid, air or electrons/ions may pass. The isolation film 210 can be made of any suitable material. In some embodiments, the isolation film 210 includes polyethylene (PE). In some embodiments, the isolation film 210 includes polypropylene (PP).

In some embodiments, the electrolytic powder 240 comprises particles of Carbon (C) and Nickel (Ni). In some embodiments, the electrolytic powder 240 comprises at least one of Polytetrafluoroethylene (PTFE), super-conductive carbon black, and graphite. In some embodiments, the diameter of the particle of the electrolytic powder 240 is in a range of 20 to 50 nanometers (nm). The small diameter of the particle of the electrolytic powder 240 causes the electrolytic powder 240 to have a greater surface area for chemical reactions. Therefore, the capacity of the water-activated power generating device 1 can be increased and the current magnitude of the water-activated power generating device 1 can also be increased.

The second fixing ring 180 includes substantially the same shape of the fixing ring 140. However, in some embodiments, the notch 181 can be eliminated from the second fixing ring 180. The inner space 180s of the second fixing ring 180 is able to withhold the air/gas produced during the chemical reactions of the water-activated power generating device 1. The inner space 180s works as a pressure controller and can prevent damage to the water-activated power generating device 1 resulting from over-pressure.

Referring to FIG. 2, the electrode structure 220 includes a hollow cylindrical shape. In some embodiments, the electrode structure 220 includes a hollow rectangle shape. The electrode structure 220 includes Magnesium (Mg) and Aluminum (Al). In some embodiments, the electrode structure 220 is an alloy comprising Magnesium (Mg) and Aluminum (Al). In some embodiments, the electrode structure 220 is made of Magnesium alloy. In some embodiments, the electrode structure 220 comprises Aluminum (Al) in a range of 2% to 6%. In some embodiments, the electrode structure 220 comprises Aluminum (Al) in a range of 2% to 6% by weight. In some embodiments, the electrode structure 220 comprises Aluminum (Al) in a range of 2% to 6% by volume.

Referring to FIG. 2, the inner surface 2201 of the electrode structure 220 is not flat. In some embodiments, the inner surface 2201 of the electrode structure 220 includes micro patterns. In some embodiments, the inner surface 2201 of the electrode structure 220 includes patterns formed by micro-etching. The micro patterns on the inner surface 2201 of the electrode structure 220 increase the reaction surface of the electrode structure 220. Therefore, the capacity of the water-activated power generating device 1 can be increased and the current magnitude of the water-activated power generating device 1 can also be increased.

In traditional water batteries, Magnesium (Mg) is commonly used as one of the electrode components. Due to the highly reactive properties of Mg, the Mg electrode in traditional water battery tends to expand/bulge during chemical reactions. The deformation of the Mg electrode in a traditional water battery will result in a short-circuiting problem that destroys the function and decreases the life of a traditional water battery. The micro patterns on the inner surface 2201 of the electrode structure 220 and the small diameter of the particle of the electrolytic powder 240 will have the advantage of gentle chemical reactions. Therefore, the expansion of the electrode structure 220 can be well controlled. In some embodiments, the expansion of the electrode structure 220 is reduced by up to 60% compared to the Mg electrode used in traditional water batteries.

The bottom conductive plate 190 is made of conductive material such as metal, alloy or any other suitable materials. The bottom conductive plate is disposed at the bottom of the electrode structure 220 and electrically connected to the electrode structure 220. The current produced by the water-activated power generating device 1 can be provided to external electronic devices through the conductive cap 110 and the bottom conductive plate 190.

Figures 3, 3A:
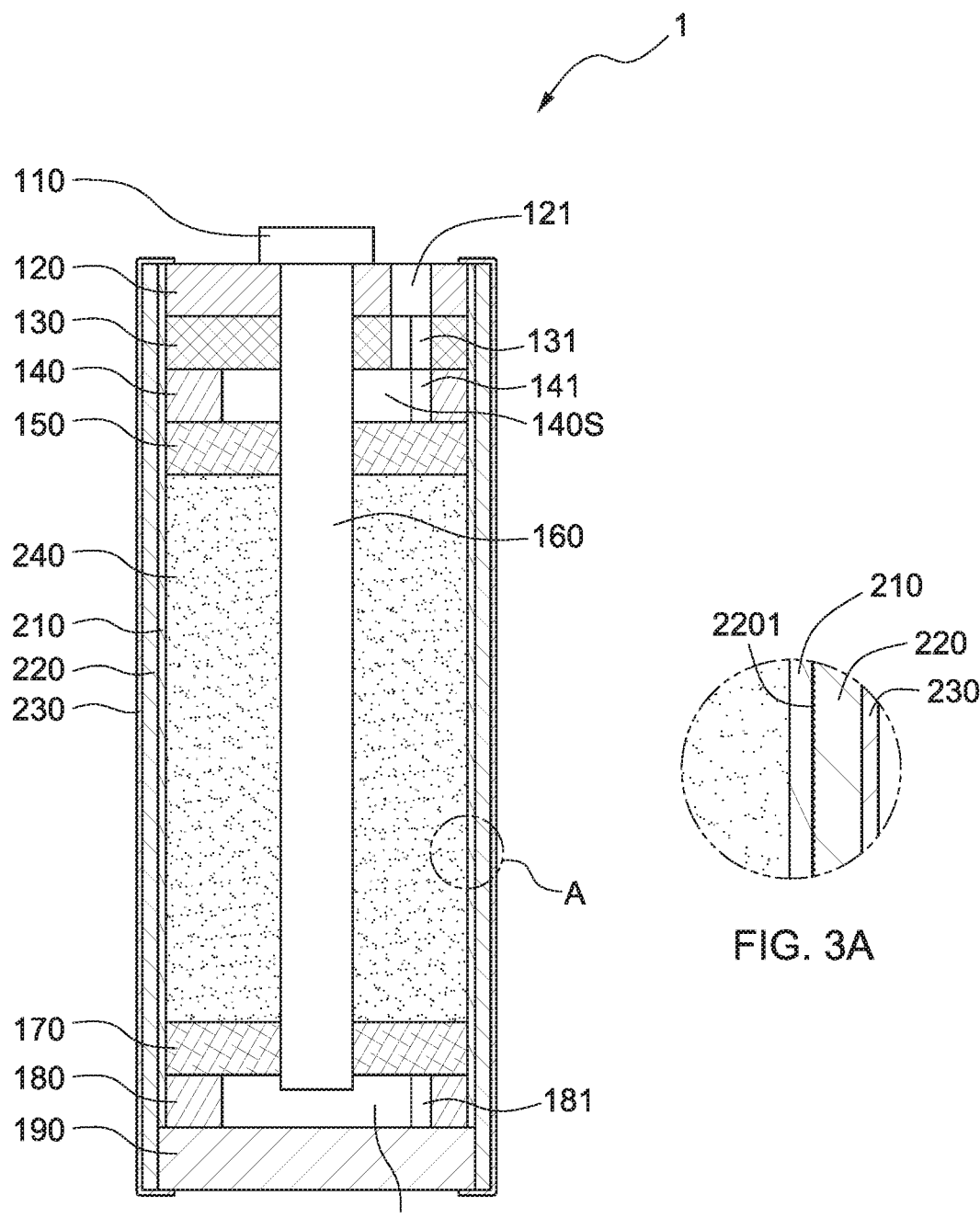
FIG. 3 is a schematic view of a water-activated power generating device according to an embodiment of the subject invention.
FIG. 3A is an enlarged view of a portion of a water-activated power generating device according to an embodiment of the subject invention.

FIG. 3 is a schematic view of a water-activated power generating device according to an embodiment of the subject invention. Referring to FIG. 3, the wrapper 230 is disposed on the outer surface of the electrode structure 220 and covers a portion of the top plate 120 and a portion of the bottom conductive plate 190. Referring to FIG. 3, the air vent 121 and the cut 131 forms a channel for air/gas produced during the chemical reactions of the water-activated power generating device 1. The air/gas produced during the chemical reactions will first accumulate within the space 140*s* and then gradually leak out through the cut 131 and the air vent 121.

Referring to FIG. 3, the electrolytic powder 240 is sandwiched by the first water storage element 150 and the second water storage element 170. Water can be injected into the water-activated power generating device 1 through the air vent 121, the cut 131 and the notch 141. The injected water will be held within the first water storage element 150 and the second water storage element 170. The injected water will also be held within the space between the particles of electrolytic powder 240. During the chemical reactions between the electrolytic powder 240 and the electrode structure 220, water contained between the first water storage element 150 and the second water storage element 170 serves as a medium for electron/ion transmission.

FIG. 3A is an enlarged view of a portion of the water-activated power generating device 1 shown in circle A of FIG. 3. Referring to FIG. 3A, the isolation film 210 is disposed adjacent to the inner surface 2201 of the electrode structure 220.

Although specific embodiments of the subject invention have been disclosed herein, it is not intended that the invention be limited to the disclosed embodiments. Those skilled in the art would recognize that modifications and variations can be made to these embodiments without departing from the spirit of the invention. It is intended that the invention encompass all such modifications and variations that fall within the scope of the appended claims.

What is claimed is:

1. A water-activated power generating device, comprising:
    a conductive cap;
    a top plate having an air vent;
    a silicon slice having a cut;
    a first water storage element;
    a fixing ring sandwiched by the silicon slice and the first water storage element and having an inner space;
    a conductive rod penetrating the top plate, the silicon slice, the fixing ring and the first water storage element, and electrically connected to the conductive cap;
    a hollow electrode structure;
    an isolation film disposed adjacent to an inner surface of the electrode structure;
    electrolytic powder disposed in a space between the isolation film and the conductive rod; and
    a bottom conductive plate disposed at the bottom of the electrode structure and electrically connected to the inner surface of the electrode structure.

2. The device of claim 1, wherein the inner surface of the electrode structure comprises micro patterns.

3. The device of claim 1, wherein the electrolytic powder comprises particles of Carbon (C) and Nickel (Ni), and the electrode structure comprises Magnesium (Mg) and Aluminum (Al).

4. The device of claim 3, wherein the electrolytic powder further comprises at least one of Polytetrafluoroethylene (PTFE), super-conductive carbon black, or graphite.

5. The device of claim 3, wherein particles of the electrolytic powder each include a diameter in a range of 20 to 50 nanometers (nm).

6. The device of claim 3, wherein the electrode structure comprises Aluminum (Al) in a range of 2% to 6% by weight.

7. The device of claim 1, wherein the first water storage element comprises wood pulp cotton.

8. The device of claim 7, wherein the first water storage element further comprises at least one of hemp, bamboo, microfiber, and plastic fibers.

9. The device of claim 1, the fixing ring comprising a notch, the notch in alignment with the cut of the silicon slice and the air vent of the top plate in a direction parallel to the inner surface of the electrode structure.

10. The device of claim 1, wherein the conductive rod comprises at least one of petroleum coke, coal, graphite, and carbon black.

11. The device of claim 1, further comprising:
    a second fixing ring having a space disposed adjacent to the conductive plate; and
    a second water storage element disposed adjacent to the second fixing ring.

12. The device of claim 11, wherein the second water storage element comprises wood pulp cotton.

13. The device of claim 1, further comprising a wrapper disposed on an outer surface of the electrode structure and covering a portion of the top plate and a portion of the bottom conductive plate.

14. The device of claim 11, wherein the electrolytic powder is disposed between the first water storage element and the second water storage element.

15. The device of claim 7, wherein the first water storage element further comprises bibulous paper.

16. The device of claim 12, wherein the second water storage element further comprises bibulous paper.

* * * * *